US012234744B2

(12) United States Patent
Liles et al.

(10) Patent No.: US 12,234,744 B2
(45) Date of Patent: Feb. 25, 2025

(54) FLOW GUIDES FOR INTERNAL COOLING OF A CMC AIRFOIL

(71) Applicant: RTX Corporation, Farmington, CT (US)

(72) Inventors: Howard J. Liles, Newington, CT (US); Tyler G. Vincent, Portland, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/843,518

(22) Filed: Jun. 17, 2022

(65) Prior Publication Data

US 2023/0407753 A1 Dec. 21, 2023

(51) Int. Cl.
*F01D 5/18* (2006.01)
*F01D 5/28* (2006.01)
(Continued)

(52) U.S. Cl.
CPC ............. *F01D 5/189* (2013.01); *F01D 5/282* (2013.01); *F01D 5/284* (2013.01); *F01D 9/065* (2013.01);
(Continued)

(58) Field of Classification Search
CPC .......... F01D 5/188; F01D 5/189; F01D 5/186; F01D 9/065; F01D 5/282; F01D 5/284;
(Continued)

(56) References Cited

U.S. PATENT DOCUMENTS 3,301,527 A * 1/1967 Kercher .................. F01D 5/189 415/115
10,934,857 B2 3/2021 Spangler et al.
(Continued)

FOREIGN PATENT DOCUMENTS

EP 3783199 A1 2/2021
EP 3808942 A1 4/2021
(Continued)

OTHER PUBLICATIONS

European Search Report for EP Application No. 23179774.7 dated Sep. 29, 2023.

*Primary Examiner* — Christopher Verdier
(74) *Attorney, Agent, or Firm* — Carlson, Gaskey & Olds, P.C.

(57) ABSTRACT

A component for a gas turbine engine includes a matrix composite component having a radially outer end and a radially inner end. The ceramic matrix component having an internal chamber defined by an inner surface. A spar is received within the internal cavity, and spaced from an inner surface of the matrix component defining a chamber with the inner surface. Flow guides are formed on one of an outer surface of the spar and the inner surface of the matrix component. The flow guides direct airflow towards a portion of the inner surface. An air inlet chamber is formed at one radial end of the spar and an air outlet chamber formed at an opposed radial end of the spar. The air inlet chamber is defined such that air will flow into the internal chamber, outwardly of the spar, and inwardly of the inner surface of the matrix component. A gas turbine engine is also disclosed.

20 Claims, 3 Drawing Sheets

(51) Int. Cl.
*F01D 9/06* (2006.01)
*F23R 3/00* (2006.01)

(52) U.S. Cl.
CPC .. *F05D 2240/126* (2013.01); *F05D 2260/201* (2013.01); *F05D 2260/22141* (2013.01); *F05D 2260/232* (2013.01); *F05D 2300/6033* (2013.01); *F23R 3/007* (2013.01)

(58) Field of Classification Search
CPC ........... F05D 2260/20; F05D 2260/201; F05D 2260/202; F05D 2260/22141; F05D 2240/126; F05D 2300/603; F05D 2300/6032; F05D 2300/6033; F23F 3/007; F23R 3/007
See application file for complete search history.

(56) References Cited

U.S. PATENT DOCUMENTS

| | | | | |
|---|---|---|---|---|
| 11,149,553 | B2 | 10/2021 | Whittle et al. | |
| 11,268,392 | B2 | 3/2022 | Townes et al. | |
| 2016/0102563 | A1* | 4/2016 | Spangler | F01D 5/02 415/115 |
| 2017/0204734 | A1 | 7/2017 | Groves, II et al. | |
| 2020/0263557 | A1 | 8/2020 | Whittle et al. | |
| 2021/0115801 | A1* | 4/2021 | Generale | F01D 5/189 |
| 2021/0123352 | A1* | 4/2021 | Townes | B33Y 80/00 |

FOREIGN PATENT DOCUMENTS

| | | | |
|---|---|---|---|
| EP | 3816400 | A1 | 5/2021 |
| GB | 2572793 | A | 10/2019 |

* cited by examiner

FLOW GUIDES FOR INTERNAL COOLING OF A CMC AIRFOIL

BACKGROUND

This application relates to cooling structure for managing cooling airflow within a ceramic matrix composite ("CMC") airfoil.

Gas turbine engines are known, and typically include a fan delivering air into a bypass duct as propulsion air. Air is also directed from the fan into a compressor section where it is compressed. Downstream of the compressor the air is directed into a combustor where it is mixed with fuel and ignited. Products of this combustion pass downstream over turbine rotors, driving them to rotate. The turbine rotors in turn drive the fan and compressor rotors.

It is known that very high temperatures are experienced by components in the gas turbine engine. This is particularly true in the combustor and turbine sections. Historically, components in these sections have been formed of metals. It has been proposed to use ceramic matrix composite materials ("CMC") for such components.

Challenges remain with regard to cooling the CMC components. Such CMC components often have an internal spar formed of an appropriate material, typically a metal. The spar provides structural support to the CMC component.

It has been proposed to have spars with an internal cooling air supply channel which then delivers the air outwardly of the spar and against the CMC component. Flow direction guides have been utilized to direct the air downstream of cooling air holes in an outer surface of the spar.

SUMMARY

In a featured embodiment, a component for a gas turbine engine includes a matrix composite component having a radially outer end and a radially inner end. The ceramic matrix component having an internal chamber defined by an inner surface. A spar is received within the internal cavity, and spaced from an inner surface of the matrix component defining a chamber with the inner surface. Flow guides are formed on one of an outer surface of the spar and the inner surface of the matrix component. The flow guides direct airflow towards a portion of the inner surface. An air inlet chamber is formed at one radial end of the spar and an air outlet chamber formed at an opposed radial end of the spar. The air inlet chamber is defined such that air will flow into the internal chamber, outwardly of the spar, and inwardly of the inner surface of the matrix component.

In another embodiment according to the previous embodiment, the matrix component is a ceramic matrix component ("CMC").

In another embodiment according to any of the previous embodiments, the CMC component defines an airfoil having a leading edge and trailing edge. The flow guides encourage airflow toward at least one of the leading edge and trailing edge.

In another embodiment according to any of the previous embodiments, the CMC component is a fixed vane.

In another embodiment according to any of the previous embodiments, the fixed vane has an outer platform radially outward of the airflow and an inner platform radially inward of the airfoil.

In another embodiment according to any of the previous embodiments, the spar has a radially outer end radially outward of the outer platform and has a radially inner end radially inward of the inner platform.

In another embodiment according to any of the previous embodiments, the flow guides encourage airflow toward the leading edge.

In another embodiment according to any of the previous embodiments, the flow guides encourage airflow towards the trailing edge.

In another embodiment according to any of the previous embodiments, the spar has a leading edge and a trailing edge separated by a first distance. The flow guides extend along a direction having a component in a radial direction and a component in an axial direction, and a ratio of the first distance to the axial component being between 0.20 and 0.90.

In another embodiment according to any of the previous embodiments, there are a plurality of the flow guides extending along non-parallel direction.

In another featured embodiment, a gas turbine engine includes a fan, a compressor section, a combustor and a turbine section. A matrix component is received within one of the combustor section and the turbine section. The matrix composite component has a radially outer end and a radially inner end. The ceramic matrix component has an internal chamber defined by an inner surface. A spar is received within the internal cavity, and spaced from an inner surface of the matrix component defining a chamber with the inner surface. Flow guides are formed on one of an outer surface of the spar and the inner surface of the matrix component. The flow guides direct airflow towards a portion of the inner surface. An air inlet chamber is formed at one radial end of the spar and an air outlet chamber formed at an opposed radial end of the spar. The air inlet chamber is defined such that air will flow into the internal chamber, outwardly of the spar, and inwardly of the inner surface of the matrix component.

In another embodiment according to any of the previous embodiments, the matrix component is a ceramic matrix component ("CMC").

In another embodiment according to any of the previous embodiments, the CMC component defining an airfoil having a leading edge and trailing edge. The flow guides encourage airflow toward at least one of the leading edge and trailing edge.

In another embodiment according to any of the previous embodiments, the CMC component is a fixed vane.

In another embodiment according to any of the previous embodiments, the fixed vane has an outer platform radially outward of the airflow and an inner platform radially inward of the airfoil.

In another embodiment according to any of the previous embodiments, the spar has a radially outer end radially outward of the outer platform and has a radially inner end radially inward of the inner platform.

In another embodiment according to any of the previous embodiments, the flow guides encourage airflow toward the leading edge.

In another embodiment according to any of the previous embodiments, the flow guides encourage airflow towards the trailing edge.

In another embodiment according to any of the previous embodiments, the spar has a leading edge and a trailing edge separated by a first distance. The flow guides extend along a direction having a component in a radial direction and a component in an axial direction. A ratio of the first distance to the axial component is between 0.20 and 0.90.

In another embodiment according to any of the previous embodiments, there are a plurality of the flow guides extending along non-parallel direction.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
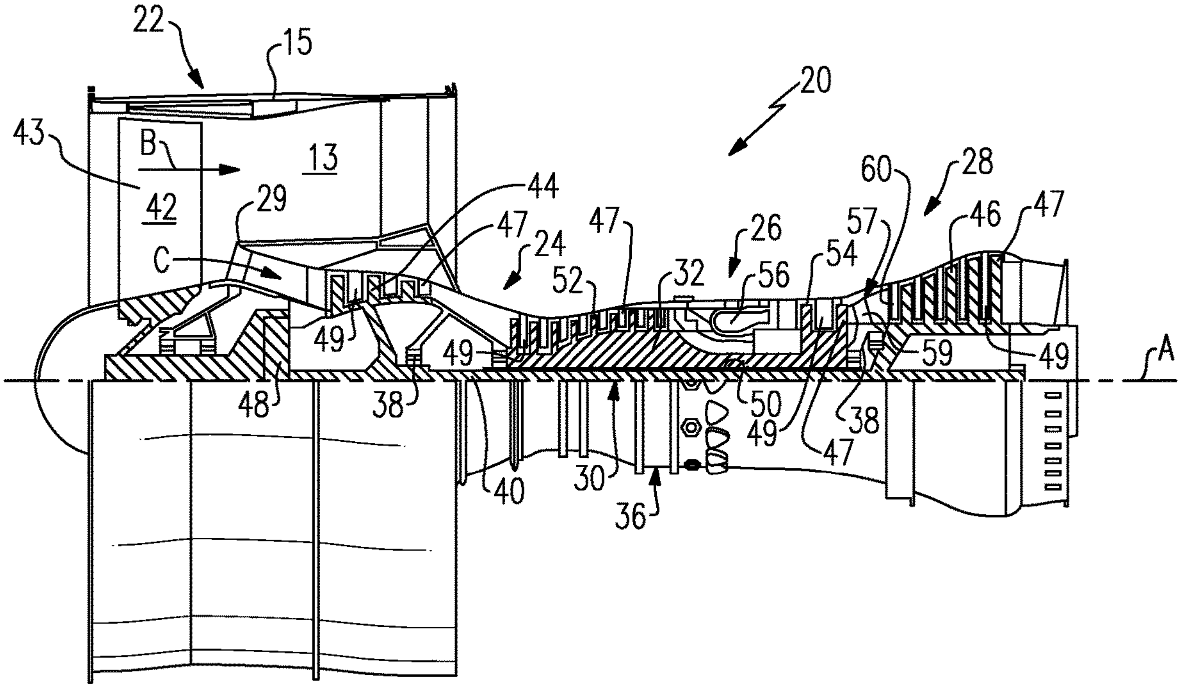
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades. The fan blades may have a fixed stagger angle or may have a variable pitch to direct incoming airflow from an engine inlet. The fan 42 drives air along a bypass flow path B in a bypass duct defined within a housing 15 such as a fan case or nacelle, and also drives air along a core flow path C for compression and communication into the combustor section 26 then expansion through the turbine section 28. A splitter aft of the fan 42 divides the air between the bypass flow path B and the core flow path C. The housing 15 may surround the fan 42 to establish an outer diameter of the bypass duct. The splitter may establish an inner diameter of the bypass duct. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated, and the vanes are schematically indicated.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct at an axial position corresponding to a leading edge of the splitter relative to the engine central longitudinal axis A. The fan pressure ratio is a spanwise average of the pressure ratios measured across the fan blade alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram } ° \text{ R})/(518.7° \text{ R})]^{0.5}$. The corrected fan tip speed can be less than or equal to 1150.0 ft/second (350.5 meters/second), and can be greater than or equal to 1000.0 ft/second (304.8 meters/second).

Figure 2A:
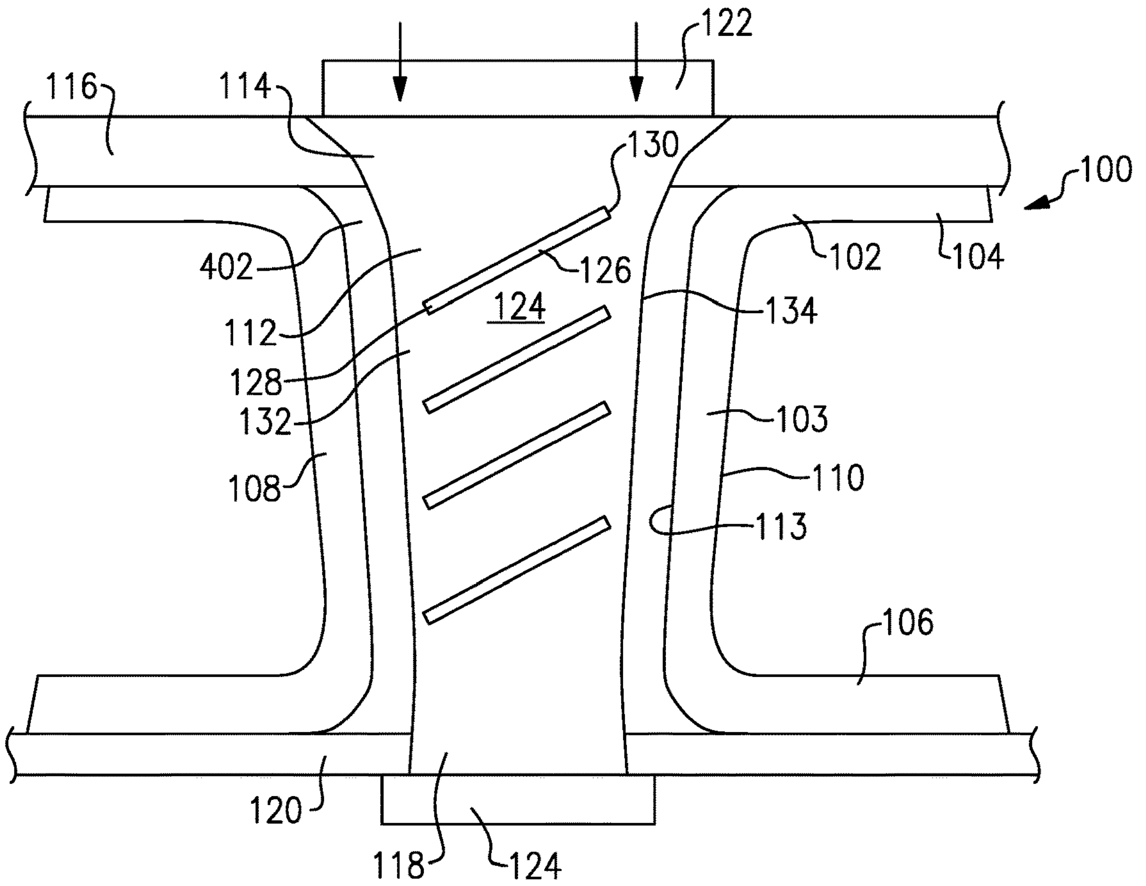
FIG. 2A is a cross-sectional view through an assembled CMC vane.

FIG. 2A shows an assembled system 100. A CMC component 102, which may be a vane such as a vane utilized in the FIG. 1 engine has an airfoil 103, a radially outer platform 104, and a radially inner platform 106. The airfoil 103 extends from a leading edge 108 to a trailing edge 110. The cooling load on the airfoil 103 is not uniform across the entire outer surface of the airfoil. Rather, there are typically localized areas on an airfoil where the cooling load is greater. As an example, the cooling load is often greater at the leading edge than at locations along the outer suction 400 or pressure 401 sides of the airfoil 103 (see FIG. 2C). Also, the trailing edge 110 may have a relatively high cooling load.

The component 102 may be formed of a ceramic matrix composite, an organic matrix composite (OMC), or a metal matrix composite (MMC). For instance, the ceramic matrix composite (CMC) is formed of ceramic fiber tows that are disposed in a ceramic matrix. The ceramic matrix composite may be, but is not limited to, a SiC/SiC ceramic matrix composite in which SiC fiber tows are disposed within a SiC matrix. Example organic matrix composites include, but are not limited to, glass fiber tows, carbon fiber tows, and/or aramid fiber tows disposed in a polymer matrix, such as epoxy. Example metal matrix composites include, but are not limited to, boron carbide fiber tows and/or alumina fiber tows disposed in a metal matrix, such as aluminum.

As known, an internal structure spar 112 may be received within an opening 113 in the CMC component 102. The spar 112 has a radially outer end 114 which extends radially outwardly of the outer platform 104. End 114 may be secured to mount structure 116 that also mounts the component 102. The spar 112 has a radially inner end 118 which extends radially inward of the inner platform 106. Inner end 118 is secured to structure 120 which also may secure the component 102. While contact is shown between mount structure 116 and the outer end 114 along the entire outer end 114, there may be less contact area.

A chamber 122 is shown schematically, and may connect to a source of cooling air. An outlet chamber 124 receives the cooling air from the cooling air from chamber 402 after it is passed outwardly of the outer surface of the spar 112. That is, the air enters the chamber 124 directly, and without passing through the spar. Now, as shown by the arrows, cooling air enters a chamber 402 between an outer surface 124 of the spar 112 and the inner surface 113 of the component 102. That air passes outwardly of the spar 112 to the chamber 402, and provides cooling air for the CMC component 102.

Notably, in some embodiment, the air may enter at the radially inner chamber 124 and pass radially outwardly to the chamber 122.

Flow guides 126 are placed along the outer surface 124 of the spar to discourage airflow to certain sections of the inner surface of opening 113. In particular, the flow guides 126 may discourage airflow to portions between the leading edge 108 and trailing edge 110, and encourage the airflow to flow to the leading edge 108 and/or the trailing edge 110. As shown, the cooling guides 126 extend along a direction having a radially inward component, and an axial component defined between the leading edge 108 and trailing edge 110. Radial and axial are defined by a rotational axis of an associated engine. The guides 126 in FIG. 2A result in reduced radial flow at the leading edge 108 and increased flow at the trailing edge 110. This is due to the angle of the guides causing a buildup of pressure towards the leading edge and results in less radial flow migration in that direction. Low pressure at the trailing edge encourages flow from the outer diameter trailing edge to the inner diameter trailing edge.

As shown, flow guides 126 extend between ends 128 and 130. The ends 128 and 130 can be seen to be axially inward of a leading edge 132 of the spar 112 and a trailing edge 134. If a distance is defined between leading edge 132 and trailing edge 134 of the spar at its thinnest portion along the radial length of the spar, a ratio of the distance to an axial component of a distance between the ends 128 and 130 is between 0.20 and 0.90.

Figure 2B:
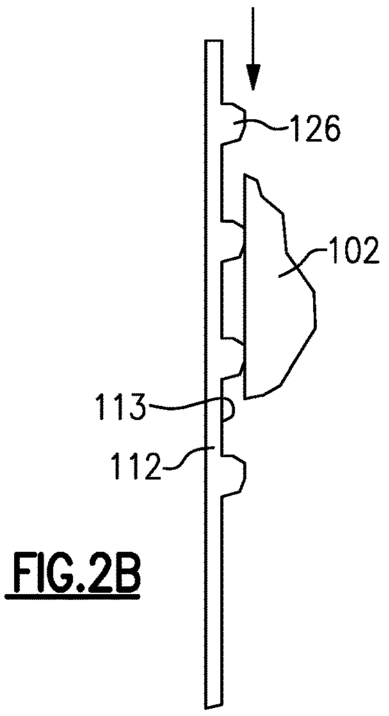
FIG. 2B is a cross-sectional view along line B-B of FIG. 2A.

FIG. 2B is a partial cross-section, and shows one portion of the outer surface 113 of the spar 112 having flow guides 126. As also shown in FIG. 2B, the guides 126 can serve to space the spar 112 relative to the inner surface 113 of the CMC component 102. That is, the guides 126 contact the component 102.

Figure 2C:
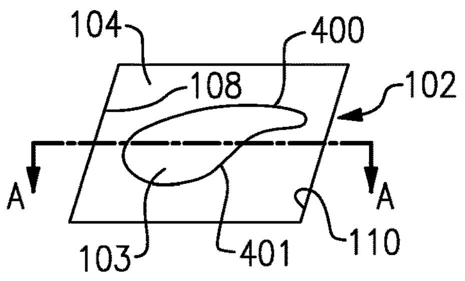
FIG. 2C is a top view of a CMC component, and showing the location of the cross-section A-A of FIG. 2A.

FIG. 2C schematically shows the component 102 having outer platform 104, and the airfoil 103 between the leading edge 108 and trailing edge 110, and pressure 401 and suction sides 400.

While the CMC component 102 is shown to be a static vane, other components may benefit from this disclosure. As an example, blade outer air seals, combustor components such as combustor panels and turbine blades may benefit from this disclosure.

Figure 3C:
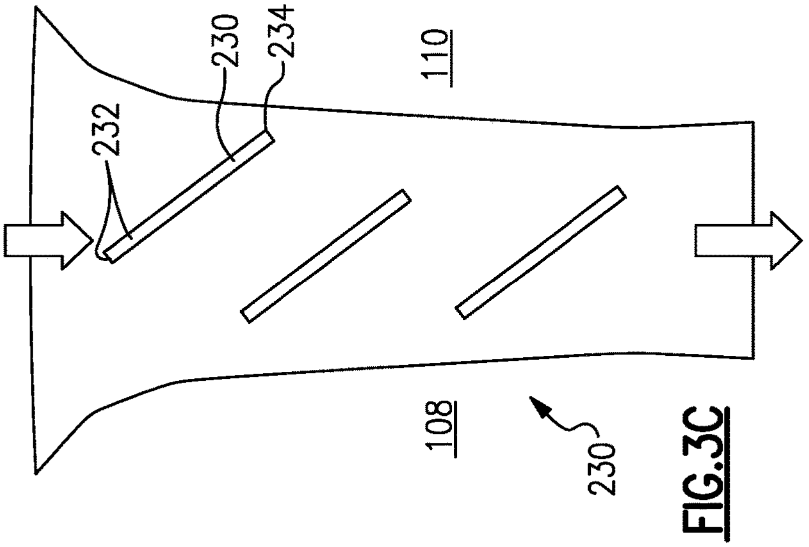
FIG. 3C shows yet another embodiment.
Figure 3B:
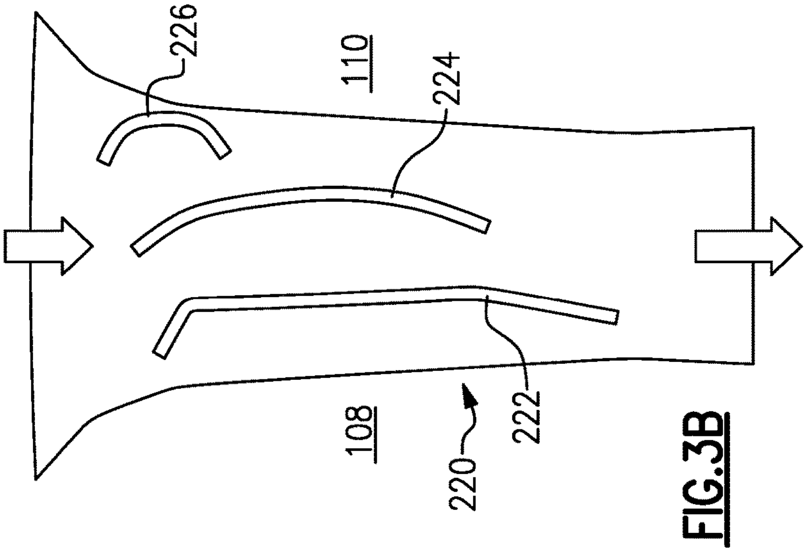
FIG. 3B shows yet another embodiment.
Figure 3A:
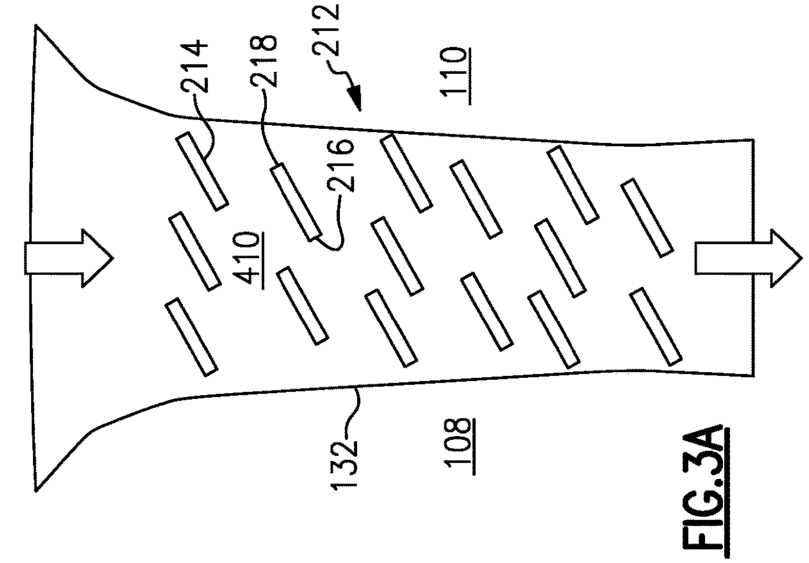
FIG. 3A shows another embodiment.

FIG. 3A shows an embodiment 212 wherein the guides 214 extend between ends 216 and 218 which are relatively close compared to the embodiment of FIG. 2A. In this embodiment, the guides 214 will still direct airflow more toward the leading edge 132, and away from axially central portions 410 of the spar 212. FIG. 3A tends to direct more air toward the trailing edge 110 than the leading edge 108. The use of the smaller segments for the guides 214 prevents complete radial flow disruption should there be contact between the guides and the inner wall of the airfoil.

FIG. 3B shows an embodiment 220 wherein the guides 222, 224 and 226 extend along distinct distances. Here the guides extend along non-parallel directions. This embodiment still encourages airflow towards leading edge 108. The FIG. 3B embodiment illustrates that the guides do not need to be linear and can have complex contouring to tailor and achieve a desired flow control.

Embodiment 230 as shown in FIG. 3C has guides 230 which extend between ends 232 and 234. In this embodiment, the guides 230 would tend to direct air more toward the trailing edge 110 than the leading edge 108. The distance ratio range disclosed above also applies to this embodiment.

As with the embodiment of FIG. 2A, the embodiments of FIGS. 3A-3C all extend along directions having at least a portion with a component in a radial direction and an axial direction.

Figure 4:
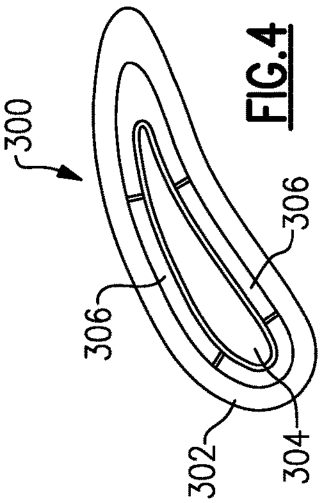
FIG. 4 shows yet another embodiment.

FIG. 4 shows an alternative embodiment 300 wherein the CMC airfoil 302 receives the spar 304. The guides 306 are formed on the inner surface of the CMC component 302 rather than on the outer surface of the spar.

A component for a gas turbine engine under this disclosure could be said to include a matrix composite component having a radially outer end and a radially inner end. The matrix component has an internal chamber defined by an inner surface. A spar is received within the internal cavity, and spaced from an inner surface of the matrix component defining a chamber with the inner surface. Flow guides are formed on one of an outer surface of the spar and the inner surface of the matrix component. The flow guides direct airflow towards a portion of the inner surface. An air inlet chamber is formed at one radial end of the spar and an air outlet chamber is formed at an opposed radial end of the spar. The air inlet chamber is defined such that air will flow into the internal chamber, outwardly of the spar, and inwardly of the inner surface of the matrix component.

While embodiments have been disclosed, a worker of skill in this art would recognize that modifications would come within the scope of this disclosure. For that reason, the following claims should be studied to determine the true scope and content of this disclosure.

What is claimed is:

1. A component for a gas turbine engine comprising:
- a ceramic matrix composite ("CMC") component having a radially outer end and a radially inner end, said CMC component having an internal cavity;
- a spar received within the internal cavity, and spaced from an inner surface of the CMC component defining a chamber with the inner surface;
- flow guides formed on one of an outer surface of said spar and said inner surface of said CMC component, said flow guides directing airflow towards a portion of the inner surface;
- an air inlet chamber being formed at one radial end of said spar and an air outlet chamber formed at an opposed radial end of said spar, and said air inlet chamber being defined such that air will flow into the air inlet chamber, along the outer side of the spar, and inwardly of the inner surface of the CMC component; and
- a portion of the flow guides on the one of the outer surface and the inner surface contacts the other of the outer surface and the inner surface.

2. The component as set forth in claim 1, wherein said CMC component defining an airfoil having a leading edge and trailing edge, and the flow guides encouraging airflow toward at least one of the leading edge and trailing edge.

3. The component as set forth in claim 2, wherein said CMC component is a fixed vane.

4. The component as set forth in claim 3, wherein said fixed vane having an outer platform radially outward of said airfoil and an inner platform radially inward of said airfoil.

5. The component as set forth in claim 4, wherein said spar having a radially outer end radially outward of said outer platform and having a radially inner end radially inward of said inner platform.

6. The component as set forth in claim 2, wherein said flow guides encouraging airflow toward said leading edge.

7. The component as set forth in claim 2, wherein said flow guides encouraging airflow towards said trailing edge.

8. The component as set forth in claim 1, wherein said spar has a leading edge and a trailing edge separated by a first distance, and said flow guides extending along a direction having a component in a radial direction and a component in an axial direction, and a ratio of said axial component to said axial first distance being between 0.20 and 0.90.

9. The component as set forth in claim 1, wherein there being a plurality of said flow guides extending along non-parallel direction.

10. The gas turbine engine as set forth in claim 1, wherein said spar has a leading edge and a trailing edge separated by a first distance, and said flow guides extending along a direction having a component in a radial direction and a component in an axial direction, and a ratio of said axial component to said axial first distance being between 0.20 and 0.90.

11. The gas turbine engine as set forth in claim 1, wherein there being a plurality of said flow guides extending along non-parallel direction.

12. The component as set forth in claim 1, wherein a source of air is communicated into the air inlet chamber directly without passing through the spar.

13. A gas turbine engine including:
- a fan, a compressor section, a combustor and a turbine section;
- a ceramic matrix component ("CMC") received within one of said combustor section and said turbine section, the CMC component having a radially outer end and a radially inner end, said ceramic matrix component having an internal cavity;
- a spar received within the internal cavity, and spaced from an inner surface of the CMC component defining a chamber with the inner surface;
- flow guides formed on one of an outer surface of said spar and said inner surface of said CMC component, said flow guides directing airflow towards a portion of the inner surface;
- an air inlet chamber being formed at one radial end of said spar and an air outlet chamber formed at an opposed radial end of said spar, and said air inlet chamber being defined such that air will flow into the air inlet chamber, along the outer side of the spar, and inwardly of the inner surface of the CMC component; and
- a portion of the flow guides on the one of the outer surface and the inner surface contacts the other of the outer surface and the inner surface.

14. The gas turbine engine as set forth in claim 13, wherein said CMC component defining an airfoil having a leading edge and trailing edge, and the flow guides encouraging airflow toward at least one of the leading edge and trailing edge.

15. The gas turbine engine as set forth in claim 14, wherein said CMC component is a fixed vane.

16. The gas turbine engine as set forth in claim 15, wherein said fixed vane having an outer platform radially outward of said airfoil and an inner platform radially inward of said airfoil.

17. The gas turbine engine as set forth in claim 16, wherein said spar having a radially outer end radially outward of said outer platform and having a radially inner end radially inward of said inner platform.

18. The gas turbine engine as set forth in claim 14, wherein said flow guides encouraging airflow toward said leading edge.

19. The gas turbine engine as set forth in claim 14, wherein said flow guides encouraging airflow towards said trailing edge.

20. A gas turbine engine including:

a fan, a compressor section, a combustor and a turbine section;

a ceramic matrix component ("CMC") received within one of said combustor section and said turbine section, the CMC component having a radially outer end and a radially inner end, said ceramic matrix component having an internal cavity;

a spar received within the internal cavity, and spaced from an inner surface of the CMC component defining a chamber with the inner surface;

flow guides formed on one of an outer surface of said spar and said inner surface of said CMC component, said flow guides directing airflow towards a portion of the inner surface;

an air inlet chamber being formed at one radial end of said spar and an air outlet chamber formed at an opposed radial end of said spar, and said air inlet chamber being defined such that air will flow into the air inlet chamber, along the outer side of the spar, and inwardly of the inner surface of the CMC component; and wherein a source of air is communicated into the air inlet chamber directly without passing through the spar.

* * * * *